(12) United States Patent
Jeanne et al.

(10) Patent No.: US 10,523,509 B2
(45) Date of Patent: Dec. 31, 2019

(54) CONFIGURING METHOD AND CORRESPONDING COMMUNICATION NETWORK DEVICE, SYSTEM, COMPUTER READABLE PROGRAM PRODUCT AND COMPUTER READABLE STORAGE MEDIUM

(71) Applicant: THOMSON LICENSING, Issy les Moulineaux (FR)

(72) Inventors: Ludovic Jeanne, Montreuil sur Ille (FR); Jean-Marie Steyer, Chateaubourg (FR); Francois Baron, Thorigne-Fouillard (FR); Koen Van Oost, Borsbeek (BE); Lionel Beaurepaire, Clayes (FR); Denis Crespel, Gosné (FR); Cyril Tostivint, Thorigné-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/641,191

(22) Filed: Jul. 3, 2017

(65) Prior Publication Data

US 2018/0013627 A1 Jan. 11, 2018

(30) Foreign Application Priority Data

Jul. 5, 2016 (EP) .................................... 16305850
Jul. 22, 2016 (EP) .................................... 16305951
Nov. 29, 2016 (EP) .................................... 16306577

(51) Int. Cl.
*H04L 12/24* (2006.01)
*H04W 24/02* (2009.01)
(Continued)

(52) U.S. Cl.
CPC ......... *H04L 41/0866* (2013.01); *H04W 16/14* (2013.01); *H04W 24/02* (2013.01);
(Continued)

(58) Field of Classification Search
CPC .. H04L 41/0866; H04W 24/02; H04W 48/16; H04W 16/14; H04W 72/0453; H04W 88/08
See application file for complete search history.

(56) References Cited

U.S. PATENT DOCUMENTS 7,606,193 B2   10/2009   McFarland et al.
9,319,968 B2    4/2016   Montemurro et al.
(Continued)

FOREIGN PATENT DOCUMENTS

CN   1905731   1/2007
EP   1672839   6/2006
(Continued)

*Primary Examiner* — Thai Nguyen
(74) *Attorney, Agent, or Firm* — Brian J. Dorini; Patricia A. Verlangieri

(57) ABSTRACT

The disclosure relates to a method for configuring an WLAN (Wireless Local Area Network) access point adapted to use at least one operational frequency channel to transmit or receive data when the access point is in an operational mode. The configuring includes checking an availability of at least one restricted frequency channel, a use of the restricted frequency channel being restricted by the availability, choosing the operational frequency channel from a set of frequency channels according to the checked availability, a first configuring comprising a first checking of restricted frequency channels belonging to a first proper sub-set of the set being performed before entering into the operational mode. At least one second checking of at least one restricted frequency channel of the set, that has not been checked as available, is performed after the first configuring.

16 Claims, 4 Drawing Sheets

(51) Int. Cl.
*H04W 16/14* (2009.01)
*H04W 72/04* (2009.01)
*H04W 48/16* (2009.01)
H04W 84/12 (2009.01)
H04W 88/08 (2009.01)

(52) U.S. Cl.
CPC ....... *H04W 48/16* (2013.01); *H04W 72/0453* (2013.01); *H04W 84/12* (2013.01); *H04W 88/08* (2013.01)

(56) References Cited

U.S. PATENT DOCUMENTS

2004/0151137 A1* 8/2004 McFarland ........... H04W 72/02
           370/329
2007/0025310 A1  2/2007 Weng et al.
2013/0039200 A1  2/2013 Park et al.
2013/0171941 A1  7/2013 Kenney et al.
2015/0003404 A1  1/2015 Gokturk et al.
2017/0041949 A1* 2/2017 Ngo ...................... H04W 16/14

FOREIGN PATENT DOCUMENTS

EP        2742617      6/2014
JP       2013201629   10/2013
WO    WO2015130336    9/2015

* cited by examiner

CONFIGURING METHOD AND CORRESPONDING COMMUNICATION NETWORK DEVICE, SYSTEM, COMPUTER READABLE PROGRAM PRODUCT AND COMPUTER READABLE STORAGE MEDIUM

REFERENCE TO RELATED EUROPEAN APPLICATIONS

This application claims priority from European Application No. 16305850.6, entitled "CONFIGURING METHOD AND CORRESPONDING COMMUNICATION NETWORK DEVICE, SYSTEM, COMPUTER READABLE PROGRAM PRODUCT AND COMPUTER READABLE STORAGE MEDIUM", filed on Jul. 5, 2016, European Application No. 16305951.2, entitled "CONFIGURING METHOD AND CORRESPONDING COMMUNICATION NETWORK DEVICE, SYSTEM, COMPUTER READABLE PROGRAM PRODUCT AND COMPUTER READABLE STORAGE MEDIUM", filed on Jul. 22, 2016, and European Application No. 16306577.4, entitled "CONFIGURING METHOD AND CORRESPONDING COMMUNICATION NETWORK DEVICE, SYSTEM, COMPUTER READABLE PROGRAM PRODUCT AND COMPUTER READABLE STORAGE MEDIUM", filed on Nov. 29, 2016, the contents of which are hereby incorporated by reference in their entirety.

1. TECHNICAL FIELD

The present disclosure relates to the field of wireless communication network devices, and to their configuration.

A configuring method and corresponding communication network device, system, computer readable program product and computer readable storage medium are described.

2. BACKGROUND ART

Many devices, like a Set Top Box (STB), integrate more and more dual band non concurrent interfaces that act each as an Access Point (AP). Such a device can operate in several frequency bands, like in the 2.4 GHz frequency band and in the 5 GHz frequency band.

There's a need to provide a solution that improves, or at least preserve at least partially, the user experience of a user of a wireless communication device compared to prior art solutions while permitting to limit the COGS of a device.

3. SUMMARY OF THE PRESENT DISCLOSURE

The present principles enable at least one disadvantage to be resolved by proposing a method comprising configuring an WLAN access point adapted to use at least one operational frequency channel to transmit or receive data when said access point is in an operational mode, said configuring comprising:
  checking an availability of at least one restricted frequency channel, a use of said restricted frequency channel being restricted by said availability;
  choosing said operational frequency channel from a set of frequency channels including said checked frequency channel, according to said checked availability;
a first configuring comprising a first checking of restricted frequency channel belonging to a first proper sub-set of said set being performed before entering into said operational mode.

According to at least one embodiment of the present disclosure, at least one second checking of at least one restricted frequency channel of said set, that has not been checked as available, is performed after said first configuring.

According to at least one embodiment of the present disclosure, said first configuring is performed during a first boot of the access point in a location (or in other word the first configuring is performed the first time the device boots in a given location).

According to at least one embodiment of the present disclosure, at least one of said second checking is performed for all not already checked frequency channels of said set.

According to at least one embodiment of the present disclosure, wherein a restricted frequency channel checked as unusable (or occupied) has to be left for a duration, at least one of said second checking is performed for all restricted frequency channels of said set which use is not forbidden at the time of said second checking.

According to at least one embodiment of the present disclosure, said method comprises storing localization information related to a current location of said WLAN access point at the time of said first and/or second checking.

According to at least one embodiment of the present disclosure, said first configuring is performed when a localization information deduced from a current location of the access point is different from said stored localization information.

According to at least one embodiment of the present disclosure, said method comprises storing a timestamp representative of the time of said first and/or said second checking when the checked frequency channel is not available.

According to at least one embodiment of the present disclosure, the choosing comprises varying a number of operational frequency channels according to said indication of availability. According to another aspect, the present disclosure relates to a communication network device comprising at least one processor configuring an WLAN access point adapted to use at least one operational frequency channel to transmit or receive data when said access point is in an operational mode, said configuring comprising:
  checking an availability of at least one restricted frequency channel, a use of said restricted frequency channel being restricted by said availability;
  choosing said operational frequency channel from a set of frequency channels including said checked frequency channel, according to said checked availability;
a first configuring comprising a first checking of restricted frequency channels belonging to a first proper sub-set of said set being performed before entering into said operational mode;

According to at least one embodiment of the present disclosure, at least one second checking of at least one restricted frequency channel of said set, that has not been checked as available, is performed after said first configuring.

According to at least one embodiment of the present disclosure, said device comprises a memory zone adapted to store configuration data comprising an indication of availability of said checked frequency channel.

Said configuration data can be stored for instance in a persistent memory zone.

By persistent memory zone, it is herein to be understand a nonvolatile memory zone, adapted to store data without any electrical power, being rewritable, like a Non-Volatile Random Access Memory (NVRAM).

According to at least one embodiment of the present disclosure, said configuration data is stored in a memory zone located in a device distinct from said communication network device. According to another aspect, the present disclosure relates to a communication network system comprising a server and at least one communication network device, said at least one communication network device comprising at least one processor configuring an WLAN access point adapted to use at least one operational frequency channel to transmit or receive data when said access point is in an operational mode, said configuring comprising:

checking an availability of at least one restricted frequency channel, a use of said restricted frequency channel being restricted by said availability;

choosing said operational frequency channel from a set of frequency channels including said checked frequency channel, according to said checked availability;

a first configuring comprising a first checking of restricted frequency channels belonging to a first proper sub-set of said set being performed before entering into said operational mode.

According to at least one embodiment of the present disclosure, at least one second checking of at least one restricted frequency channel of said set, that has not been checked as available, is performed after said first configuring and said server comprises a memory zone adapted to store configuration data comprising an indication of availability of said checked frequency channel.

According to at least one embodiment of the present disclosure, said system comprises at least two communication network devices and said choosing is performed according to configuration data comprising indications of availability stored by several communication network devices.

According to another aspect, the present disclosure relates to a non-transitory computer readable program product.

According to at least one embodiment of the present disclosure, the non-transitory computer readable program product comprises program code instructions for performing, when said non-transitory software program is executed by a computer, a method comprising configuring an WLAN access point adapted to use at least one operational frequency channel to transmit or receive data when said access point is in an operational mode, said configuring comprising:

checking an availability of at least one restricted frequency channel, a use of said restricted frequency channel being restricted by said availability;

choosing said operational frequency channel from a set of frequency channels including said checked frequency channel, according to said checked availability;

a first checking of restricted frequency channels belonging to a first proper sub-set of said set being performed before entering into said operational mode;

at least one second checking of at least one restricted frequency channel of said set, that has not been checked as available, being performed after said first configuring.

According to another aspect, the present disclosure relates to a computer readable storage medium carrying a software program.

According to at least one embodiment of the present disclosure, said computer readable storage medium carrying a software program comprises program code instructions for performing, when said non-transitory software program is executed by a computer, a method comprising configuring an WLAN access point adapted to use at least one operational frequency channel to transmit or receive data when said access point is in an operational mode, said configuring comprising:

checking an availability of at least one restricted frequency channel, a use of said restricted frequency channel being restricted by said availability;

choosing said operational frequency channel from a set of frequency channels including said checked frequency channel, according to said checked availability;

a first configuring comprising a first checking of restricted frequency channels belonging to a first proper sub-set of said set being performed before entering into said operational mode;

at least one second checking of at least one restricted frequency channel of said set, that has not been checked as available, being performed after said first configuring.

According to another aspect, the present disclosure relates to a method comprising configuring an WLAN access point adapted to use at least one operational frequency channel, selected (or in other words chosen) from a set of frequency channels, for transmitting or receiving data when said access point is in an operational mode, a use of at least one of said frequency channels, called restricted frequency channel, being restricted by an availability of said restricted frequency channel, said configuring comprising:

checking an availability of at least one of said restricted frequency channels;

storing, for instance in a persistent memory zone, configuration data comprising an indication of availability of said checked frequency channel;

selecting (or in other word choosing) said operational frequency channel from said set of frequency channels according to said indication of availability;

a first configuring being performed before entering into said operational mode on a first sub-set of said set of frequency channels, said first sub-set being included in and different from said set.

According to an embodiment of the present disclosure, at least one second configuring is performed on at least one second sub-set of said set, comprising at least one frequency channel not included in said first sub-set when said access point is not transmitting and/or receiving data.

For instance, the second configuring can be performed when none of said frequency channels of said first sub-set is used by said access point.

According to an embodiment of the present disclosure, said first configuring is performed during a first boot of the access point in a first location.

The second configuring can be performed after the first configuring, for instance after another boot of the device, or when the device is in a maintenance mode.

According to an embodiment of the present disclosure, said first and/or second configuring comprises storing localization information related to a current location of said WLAN access point at the time of said checking.

According to an embodiment of the present disclosure, said first configuring is performed when a localization information deduced from a current location of the access point is different from said stored localization information.

According to an embodiment of the present disclosure, said second configuring is performed a plurality of times (e.g. periodically (for instance each night)).

According to an embodiment of the present disclosure, said WLAN access point is a dual band non concurrent WIFI access point.

According to an embodiment of the present disclosure, said first and/or second checking of a restricted frequency channel comprise detecting a current use of said frequency restricted channel by a radar.

According to an embodiment of the present disclosure, wherein when at least one indication of availability is representative of an availability of a frequency channel, the selecting comprises selecting at least one of said available frequency channels.

According to an embodiment of the present disclosure, said selecting takes into account the frequency band of said frequency channels.

According to an embodiment of the present disclosure, said first configuring and/or said second configuring comprise storing a timestamp representative of the time of said checking when the checked frequency channel is not available.

According to an embodiment of the present disclosure, said configuration data is stored in a memory zone is located on said WLAN access point.

According to an embodiment of the present disclosure, said configuration data is stored in a memory zone comprised a nonvolatile memory located in a device distinct from [or separate from] said WLAN access point.

According to an embodiment of the present disclosure, said persistent memory zone is located a device distinct from said WLAN access point and said selecting is performed according to indications of availability stored by several access points.

According to an embodiment of the present disclosure, when a radar is detected in a restricted frequency channel, said method comprise storing a timestamp representative of the time of the detection.

According to an embodiment of the present disclosure, said second checking is performed when said chosen frequency channel is not used by a client device.

According to an embodiment of the present disclosure, the selecting can comprise varying a number of operational frequency channels according to said indication of availability.

According to an embodiment of the present disclosure, said WLAN comprises a WIFI network.

According to another aspect, the present disclosure relates to a communication network device comprising at least one processor configured for configuring an WLAN access point adapted to use at least one operational frequency channel, selected from a set of frequency channels, for transmitting or receiving data when said access point is in an operational mode, a use of at least one of said frequency channels, called restricted frequency channel, being restricted by an availability of said restricted frequency channel, said configuring comprising:
  checking an availability of at least one of said restricted frequency channels;
  storing configuration data comprising an indication of availability of said checked frequency channel;
  selecting (or in other word choosing) said operational frequency channel from said set of frequency channels according to said indication of availability;
a first configuring being performed before entering into said operational mode on a first sub-set of said set of frequency channels, said first sub-set being included in and different from said set.

According to an embodiment of the present disclosure, at least one second configuring is performed on at least one second sub-set of said set, comprising at least one frequency channel not included in said first sub-set when said access point is not transmitting and/or receiving data.

For instance, the second configuring can be performed when none of said frequency channels of said first sub-set is used by said access point.

While not explicitly described, the communication network device of the present disclosure can be adapted to perform the configuring method of the present disclosure in any of its embodiments.

According to another aspect, the present disclosure relates to a communication network system comprising a server and at least one communication network device, said at least one communication network device comprising at least one processor configured for configuring an WLAN access point adapted to use at least one operational frequency channel, selected (or in other word chosen) from a set of frequency channels, for transmitting or receiving data when said access point is in an operational mode, a use of at least one of said frequency channels, called restricted frequency channel, being restricted by an availability of said restricted frequency channel, said configuring comprising:
  checking an availability of at least one of said restricted frequency channels;
  storing configuration data comprising an indication of availability of said checked frequency channel;
  selecting (or in other word choosing) said operational frequency channel from said set of frequency channels according to said indication of availability;
a first configuring being performed before entering into said operational mode on a first sub-set of said set of frequency channels, said first sub-set being included in and different from said set.

According to an embodiment of the present disclosure, at least one second configuring is performed on at least one second sub-set of said set, comprising at least one frequency channel not included in said first sub-set when said access point is not transmitting and/or receiving data and said indication of availability is stored by said server.

For instance, the second configuring can be performed when none of said frequency channels of said first sub-set is used by said access point.

While not explicitly described, the communication network system of the present disclosure can be adapted to perform the configuring method of the present disclosure in any of its embodiments.

While not explicitly described, the present embodiments related to a configuring method or to the corresponding communication network device or system can be employed in any combination or sub-combination. For example, some embodiments can involve a communication device comprising a dual band non concurrent WIFI access point, said first and/or second configuring comprises storing localization information related to a current location of said WLAN access point at the time of said checking and the processor is configured for storing a timestamp representative of the time of a detection of a radar in a restricted frequency channel.

According to another aspect, the present disclosure relates to a non-transitory program storage device, readable by a computer.

According to an embodiment of the present disclosure, said non-transitory computer readable program product tangibly embodies a program of instructions executable by a computer to perform the method described above, in any of its embodiments.

Notably, according to an embodiment of the present disclosure, said disclosure relates to a non-transitory computer readable program product comprising program code instructions for performing, when said non-transitory software program is executed by a computer, a method comprising configuring an WLAN access point adapted to use at least one operational frequency channel, selected from a set of frequency channels, for transmitting or receiving data when said access point is in an operational mode, a use of at least one of said frequency channels, called restricted frequency channel, being restricted by an availability of said restricted channel, said configuring comprising:

checking an availability of at least one of said restricted frequency channels;

storing configuration data comprising an indication of availability of said checked frequency channel;

selecting (or in other word choosing) said operational frequency channel from said set of frequency channels according to said indication of availability;

a first configuring being performed before entering into said operational mode on a first sub-set of said set of frequency channels, said first sub-set being included in and different from said set.

According to an embodiment of the present disclosure, at least one second configuring is performed on at least one second sub-set of said set, comprising at least one frequency channel not included in said first sub-set when said access point is not transmitting and/or receiving data. For instance, said second configuring can be performed when none of said frequency channels of said first sub-set is used by said access point.

According to another aspect, the present disclosure relates to a computer readable storage medium carrying a software program comprising program code instructions for performing the method of the present disclosure, in any of its embodiments, when said non transitory software program is executed by a computer.

Notably, according to an embodiment of the present disclosure, said disclosure relates to a computer readable storage medium carrying a software program comprising program code instructions for performing, when said non-transitory software program is executed by a computer, a method comprising configuring an WLAN access point adapted to use at least one operational frequency channel, selected from a set of frequency channels, for transmitting or receiving data when said access point is in an operational mode, a use of at least one of said frequency channels, called restricted frequency channel, being restricted by an availability of said restricted frequency channel, said configuring comprising:

checking an availability of at least one of said restricted frequency channels;

storing configuration data comprising an indication of availability of said checked frequency channel;

selecting (or in other word choosing) said operational frequency channel from said set of frequency channels according to said indication of availability;

a first configuring being performed before entering into said operational mode on a first sub-set of said set of frequency channels, said first sub-set being included in and different from said set.

According to an embodiment of the present disclosure, at least one second configuring is performed on at least one second sub-set of said set, comprising at least one frequency channel not included in said first sub-set when said access point is not transmitting and/or receiving data. For instance, said second configuring can be performed when none of said frequency channels of said first sub-set is used by said access point.

As will be appreciated by one skilled in the art, aspects of the present disclosure can be embodied as a system, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", module" or "system". Furthermore, aspects of the present disclosure can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage mediums to which the present disclosure can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it will be appreciated by those skilled in the art that the block diagrams presented herein represent conceptual views of illustrative system components and/or circuitry of some embodiments of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

4. LIST OF DRAWINGS

The present disclosure will be better understood, and other specific features and advantages will emerge upon reading the following description, the description making reference to the annexed drawings wherein.

5. DETAILED DESCRIPTION OF THE EMBODIMENTS

Figure 1:
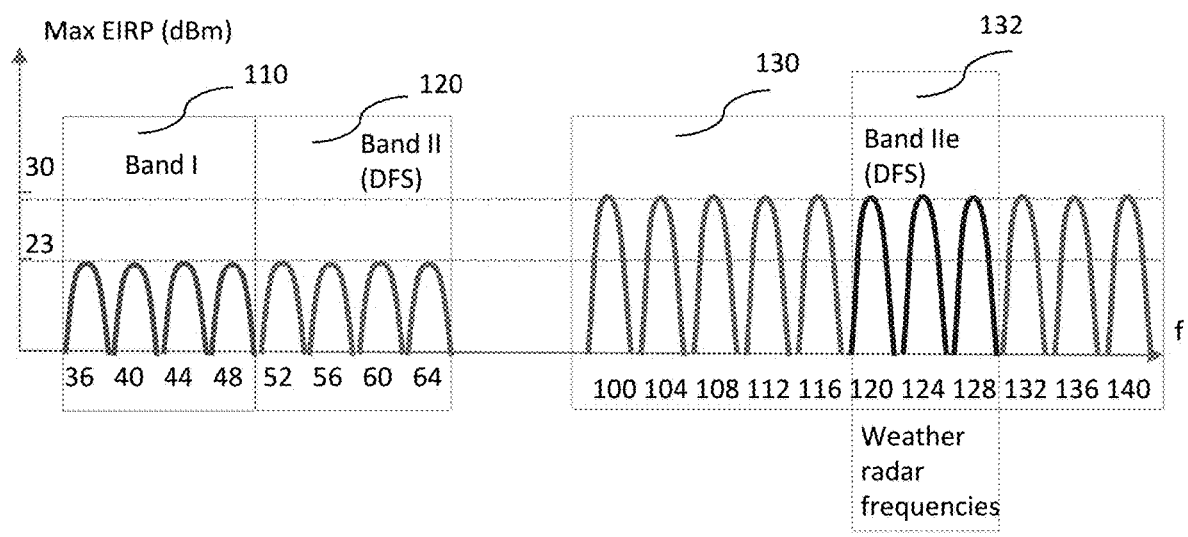
FIG. 1 shows an example of a frequency spectrum usable by a wireless communication network device according to a particular embodiment of the present disclosure.

Many wireless devices operate in the 2.4 GHz frequency band rather than in the 5 GHz frequency band. Indeed, even though the 5 GHz frequency band extends the available spectrum, and provides the right to transmit more power for a better Wi-Fi coverage, the use of some channels of the 5 GHz frequency band may be restricted by some regulatory constraints, that specify that a frequency channel used by a radar (like a weather radar or a military radar notably) must not be used by another device.

In such a case, a Dynamic Frequency Selection (DFS) algorithm must be used by a device. According to the DFS mechanism, before using a candidate restricted frequency channel (also called hereinafter a DFS channel), an access point (AP) has to make sure that the candidate channel is not used by a radar (this checking is also called by the one skilled in the art as "clearing" the frequency). The operation consists in listening on the DFS channel, without transmitting, during a minimum of time for detecting the presence or not of a radar. Furthermore, a device has to stop transmitting and to leave the DFS channel it is using during certain time intervals (like 1 second for stopping transmitting and 10 s for leaving the channel), when a radar is detected.

The DFS specifies time requirements like a minimum scanning (or listening) time before using a DFS channel and a minimum time without using a DFS channel again once a radar has been detected in this DFS channel. The specified time can vary based upon regulations and also upon the bands used.

According to European Regulation for instance, the minimum scanning time is specified as being a 1 minute duration per channel.

It is also to be noted that minimum scanning time requirements are given per channel. A wireless access point often uses a frequency band including several channels, thus the time spent on scanning can be obtained by multiplying the minimum scanning time by the number of channels. This introduces a delay that can be considered as a major inconvenient during the operating of a device having real time constraints, like a STB for instance. Thus, some providers offer electronic components (like components with an Off Channel Access Control (OCAC) functionality) that permit to scan, or clear, a frequency in advance while the device is operating at another frequency. However, the use of this component has a significant impact on the Cost of Goods Sold (COGS) of an electronic product.

At least one embodiment of the present disclosure offers a new way of configuring a wireless device adapted to use at least one DFS channel. Notably, at least one embodiment of the present disclosure offers a new way of clearing frequency channels subject to DFS constraint.

It can be of interest, for a communication network device that is adapted to operate in a DFS channel, to clear DFS frequency channels in advance in order to be able to use an alternate channel in case of radar detection in the frequency channel actually in use when the device is operating.

However, because of the minimum scanning time requirement by a DFS algorithm, there is a risk for a device that performs sequentially (in advance) a scan of all frequency channels it is adapted to use, not to reach a user's expectation in terms of response time and thus to be perceived by a user as a very slow device, being of poor quality.

At least some embodiments of the present disclosure propose to perform a first and a second configuring, the first configuring being performed at the first boot at a given location of the device and the second configuring being performed later. During the first configuring, checking is performed only on a sub-set of the DFS frequency channels until the number of the available frequency channels needed by the device in operational mode, plus some fallback channels in some embodiments, has been reached.

The clearing of the remaining DFS frequency channels (either not yet checked, either checked as unusable) can be performed during at least one second configuring.

According to at least one embodiment of the present disclosure (like embodiments where enough non-restricted channels can be used as fallback channels), the method can be performed without extra/specific real time scanning mechanism that would have to be embedded in the AP. Thus, at least one embodiment of the present disclosure can help limiting the Cost of goods sold (COGS) of an electronic device. Furthermore, at least one embodiment of the present disclosure can contribute to limit moments of scanning when the device is operating. Thus, the user experience can be preserved.

Indeed, with the assumption that a limited number of DFS channels checked as available (or usable) during the first configuring, will be used by radars during a time period between the first and a second configuring, a sufficient number of channels should be usable, thus permitting for a good level of operation.

Figure 3:
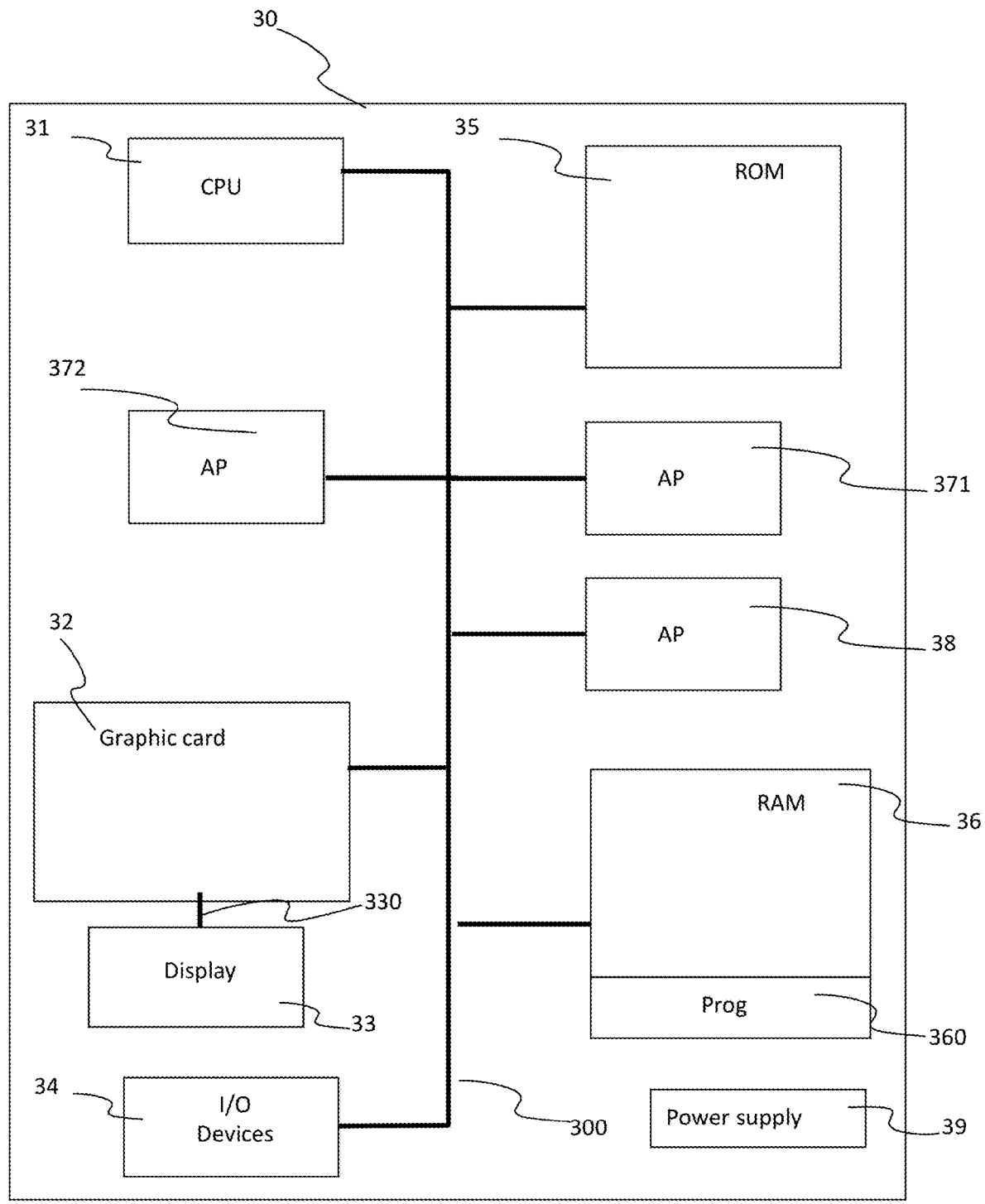
FIG. 3 illustrates a communication network device adapted to at least one particular embodiment of the present disclosure.

FIG. 3 describes the structure of a communication network device 30 according to at least one embodiment of the present disclosure. This device can be a Wi-Fi communication network access point.

In the particular embodiment of FIG. 3, the communication network device 30 can comprise the following devices, linked together via a data and address bus 300, which can also carry a timer signal:

a micro-processor 31 (or CPU);
a graphics card 32 (depending on embodiments, such a card may be optional);
at least one Input/Output module 34, (like a keyboard, a mouse, a led, and so on);
a ROM (or «Read Only Memory») 35;
a RAM (or «Random Access Memory») 36 (for instance a NVRAM);
two communication interfaces 371, 372 configured for the reception and/or transmission of data, via a wireless connection (notably of type WIFI or Bluetooth®) at a first frequency;
a wired communication interface 38;
a power supply 39.

In some embodiments, the communication network device 30 can also comprise, or be connected to, a display module 33, for instance a screen, directly connected to the graphics card 32 by a dedicated bus 330. In a variant, the display can be external to the electronic device 30. In some embodiments, the communication network device 30 can communicate with the display 33 thanks to a wireless interface. In other embodiments, the communication network device 30 can communicate with the display thanks to a wired interface, like a cable transmitting display signals. The communication network device 30 can comprise a connector (not illustrated) or a transmitting module adapted to transmit a display signal to an external display apparatus like an LCD or plasma screen or a video projector.

Each of the mentioned memories can comprise at least one register, that is to say a memory zone of low capacity (a few binary data) or high capacity (with a capability of storage of a whole program or of all or part of data representative of data to be calculated or displayed).

When the communication network device is powered on, the microprocessor 31 loads the program instructions 360 in a register of the RAM 36, notably the processes needed for performing at least one embodiment of the configuring method described herein, and executes the program instructions.

According to a variant, the communication network device 30 comprises several microprocessors.

According to another variant, the power supply 39 is external to the communication network device 30.

In the particular embodiment illustrated in FIG. 3, the microprocessor 31 can configure an WLAN access point adapted to use at least one operational frequency channel to transmit or receive data when the access point is in an operational mode, configuring the WLAN access point comprising:
- checking an availability of at least one restricted frequency channel, a use of the restricted frequency channel being restricted by the availability;
- choosing the operational frequency channel from a set of frequency channels including the checked frequency channel, according to the checked availability;
- a first configuring comprising a first checking of restricted frequency channels belonging to a first proper sub-set of said set being performed before entering into the operational mode;
- In the particular embodiment illustrated in FIG. 3, at least one second checking of at least one restricted frequency channel of the set, that has not been checked as available, is performed after the first configuring.

In the particular embodiment illustrated in FIG. 3, the microprocessor 31 can be configured for configuring an WLAN access point adapted to use at least one operational frequency channel, selected from a set of frequency channels, for transmitting or receiving data when the access point is in an operational mode, a use of at least one of the frequency channels, called restricted frequency channel, being restricted by an availability of the restricted frequency channel, the configuring comprising:
- checking an availability of at least one of the restricted frequency channel(s);
- storing configuration data comprising an indication(s) of availability of the checked frequency channel (s);
- selecting (or in other words choosing) the operational frequency channel from the set of frequency channels according to the indication(s) of availability;
- a first configuring being performed before entering into the operational mode on a first sub-set of the set of frequency channels, said first sub-set being a proper subset of said set (that is to say the first sub-set being included in and different (or in other word distinct) from the set); and
- at least one second configuring being performed on at least one second sub-set of the set, comprising at least one frequency channel not included in said first sub-set when said access point is not transmitting and/or receiving data.

For instance, the second configuring can be performed when none of the frequency channels of the first sub-set is used by the access point.

In the illustrated embodiment, the communication network device is a Wi-Fi device, more precisely a dual band Access Point device. One skilled in the art can appreciate that the techniques disclosed herein can also be applied when more than two bands of operating frequencies are utilized.

In the detailed embodiment of FIG. 1, the communication network device can operate in several frequency bands, named herein "Band I" 110, "Band II" 120 and "Band IIe" 130. Of course, FIG. 1 is only illustrative. For clarity, some channels of a band may have been omitted in the illustration.

"Band I" 110 is directly usable without DFS scanning. The Maximum Equivalent Isotropically Radiated Power (EIRP) in "Band I" is around 23 dBm. As "Band I" 110 can be used by non DFS Access Points, many wireless devices are configured to operate in this band. Thus, a device operating in this band may encounter problems of channel occupation.

Band II 120 provides an extended spectrum, while offering the same Maximum Equivalent Isotropically Radiated Power as the Band I 110. Band II 120 is less occupied than "Band I" 110, as a DFS mechanism needs to be implemented by the devices operating in this band. As the presence of a radar can fluctuate depending on many factors (like notably the location of the device, the activity of the radar, the location of the radar, which can also evolve in case of an embedded radar), a channel of "Band II" 120 can be sometimes available and sometimes used by a radar, thus requesting a device to interrupt exchanges on that channel.

"Band IIe" 130 allows higher Maximum Equivalent Isotropically Radiated Power (around 30 dBm) but requires a DFS mechanism. A sub-band 132 of Band IIe contains channels known to be used by weather radars.

According to the DFS mechanism, a device that wants to use a DFS channel of Band II 120 or Band IIe 130, except from the band 132 used by weather radars, must first listen (or scan) the channel during a primary scanning time equal to 1 minute. Thus, if a channel represents a frequency band of 20 MHz, a device that needs frequency channels (notably contiguous frequency channels) of total size 40 MHz can have to wait during a total scanning time of 2 minutes.

If several channels are aggregated (in a resulting channel of 40, 80 or 160 MHz for instance), the total scanning time can be reduced (for instance only 1 minute for a channel of size 40 MHz). However, in case of detection of radar in an aggregate channel, extra scan need to be performed in order to determine the channel of 20 MHz where the radar is present.

In the band 132 used by weather radars, the DFS primary scanning time is even larger (like 10 minutes per channel).

When a radar is detected in a DFS channel (either in Band II or Band IIe), the DFS channel has to be left during at least 30 minutes. Furthermore, before using again the DFS channel where the radar has been detected, a primary scanning of the channel is required to be performed again.

It is to be noted that the Wi-Fi spectrum in the 5 GHz band can differ amongst different countries.

Figure 2:
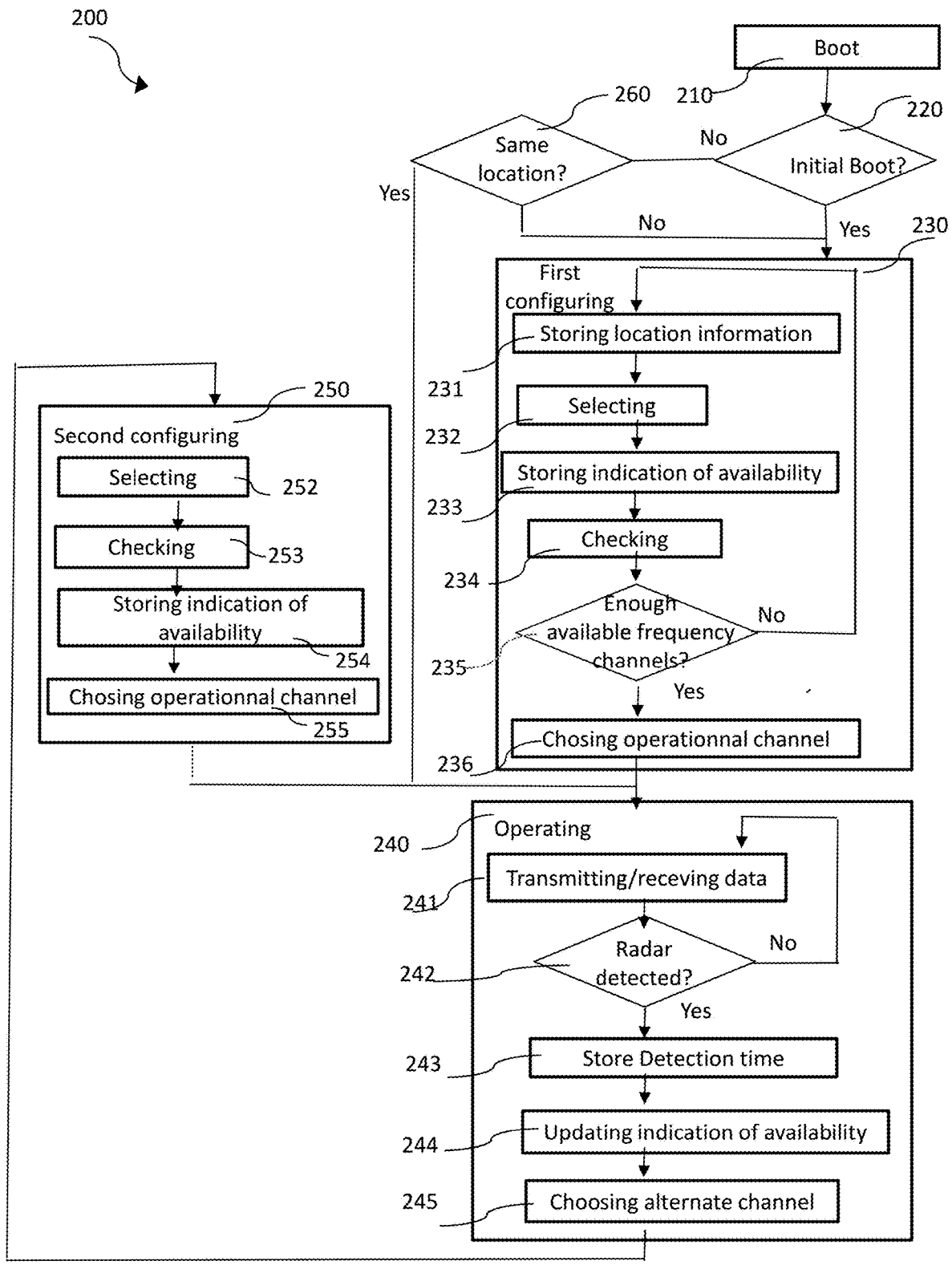
FIG. 2 is a functional diagram that illustrates a particular embodiment of a configuring method of the present disclosure.

FIG. 2 shows the configuring method 200 of the present disclosure, in a particular embodiment, implemented in a communication network device 30, as illustrated by FIG. 3.

In the detailed embodiment, the method notably comprises a boot 210 and/or an initialization of the communication network device.

According to FIG. 2, the method can comprise testing if the current boot is the initial boot of the device (during or just after the device installation), and/or if the device has been moved to a new location (compared to a location information previously stored for instance). In such situations, the device has low knowledge of the actual availability of the frequency bands. Notably it cannot rely on the result of previously performed frequency scans. If it is the initial boot 220 or if the device is located in a new location 260, then the method comprises performing a first configuring 230.

In the illustrated embodiment, the first configuring can comprise storing 231 the current localization of the device. The current Access Point localization can be performed by identifying the public Internet Protocol (IP) address of the device, or by using Global Positioning System (GPS) information, if available. For instance, the device localization information is stored in a Non-Volatile RAM (NVRAM) of the device The first configuring 230 can comprise iterative checking (or in other words clearing) 233 of channels. In the illustrated embodiment, those clearings are performed only until the number of channels needed for the device to operate normally in an operating mode, plus a backup channel is reached. For instance, if the device needs two channels of 20 MHz each, 3 channels of 20 MHz can be scanned during the setup of the STB. If the device needs two pairs of channels of 20 MHz each, 3 pairs of channels of 20 MHz each will be scanned during the setup of the STB. Of course, in other embodiments, a different number of back up channels can be checked.

In some embodiments, the method can comprise, prior to the checking 233, selecting 232 the channel(s) to be checked. The selecting can notably comprise the determining of an order of scanning beyond the selected channels. For instance, in some embodiments, channels located in the Band II can be scanned first. In other embodiment, channels located in Band IIe but outside the band for weather radars can be scanned first.

In some embodiments, the selecting 232 can comprise selecting at least one channel in a band with no DFS constraint (like Band I as illustrated in FIG. 1). Such a selecting can be performed notably when it is not possible to get enough cleared DFS channels.

In some embodiments, the channels to be selected can be determined by taking into account of default parameters of the device. Such default parameters can define for instance at least one channel to be used preferentially in operational mode for transmitting and/or receiving data, or at least one channel to be used as a backup channel.

It is to be noted that checking and storing can be optional for non-restricted channels (like channels of Band I).

It is to be noticed that DFS mechanism only requires a scan to be performed before the use of a DFS channel. It does not require the scan to be performed at the moment of the transmission and/or reception of data. It is permitted by regulatory and/or DFS certification authority that the scan can be done in advance. Thus, it can be possible for the device to use a frequency scanned during the first checking of the first configuring and considered as available (or in other words cleared) without performing a new scan.

The method can also comprise storing 234 an information representative of the result of the clearing. This information can be stored in at least one non-volatile memory. The stored information comprises an indication of channel availability. An indication of channel availability can permit differentiating a channel where no radar has been detected during the check (called herein a "cleared channel") from a channel that has not yet been checked (called herein "un-cleared channel") and/or a channel where a channel has been detected (called herein "occupied channel" or "unusable channel").

Depending upon embodiments, only the status of scanned frequency channels can be stored (that is to say cleared or occupied channels) or the status of all channels (that is to say cleared, un-cleared, and occupied channels). Notably, the method can comprise storing 234 the status of all scanned channels in a non-volatile RAM, including for the occupied channels, the date and time of the detection of a radar on this frequency, and at least one localization information related to the current location of the STB at the time of the first configuring and/or the checking of the frequency. Depending upon embodiments, the memory zone can be stored locally on the device, for instance in a persistent memory zone, or in a memory zone (like a Random-Access Memory (RAM)) of another device, being either a peripheral device of the communication network device 30 or a distant server, storing indication of availability of frequency channels obtained from several communication network devices.

According to the FIG. 2, the selecting 232, checking 233 and storing 234 of indication of availability of a channel can be performed iteratively until the number of available channels needed (taking account of the backup channel (s)) is reached 235.

Depending on embodiments and/or occupation of the frequency bands, the available channels can include cleared channel and/or not-restricted channels.

As an example, according to the selecting, the Access Point can first start DFS scanning of 6 channels of the Band IIe (for having an EIRP of 30 dBm). It represents for instance a 6 minutes duration for scanning channels 100 to 112, 132 and 136 according to FIG. 2.

The result of the scan can be stored in a NVRAM (for instance a local NVRAM that is also storing the location information). In the illustrated embodiment, if enough frequency channels are available 235, the method also comprises choosing 236 at least one frequency channel for its operation, according to the stored indications of availability, and operating 240 in an operational mode, with the chosen channel enabling for its operation. The choosing can notably take into account default parameters of the device relating to at least one channel to be chosen preferentially if available (or in other word cleared), like a particular channel to be chosen for transmitting and/or receiving data, or priority rules (in order to choose preferentially a channel belonging to the band "Band IIe" for instance). Such default parameters can be stored in the NVRAM for instance.

Notably, if contiguous frequency channels of total size, or a unique channel of size, 80 MHz is/are available (like 100-104-108-112 frequencies as illustrated by FIG. 1), the chosen corresponding frequency channels of 80 MHz can be enabled.

If not, a 40 MHz channel can be enabled in the Band IIe.

If no cleared DFS channel is available in the Band IIe, then a channel in Band I can be used. It can be either a channel of size 80 or 40 MHz The channel being currently used by the access point can also be stored in the NVRAM.

In some embodiment, during the first configuring a maximum 10 channels of 20 MHz (5 channels of 40 MHz) can be checked as available:

4 channels always available in the Band I (23 dBm)

6 channels available in the Band IIe (30 dBm)

When the STB is operating 240 in an operating mode, the method can comprise transmitting and/or receiving data 241 on the chosen frequency channel until a radar is detected. Indeed, in normal operational mode on a DFS frequency, the Access Point can be permanently or periodically scanning the DFS frequency for detecting a radar.

If a radar is detected 242, information related to the detection is stored in the non-volatile RAM for marking the frequency as unusable (or in other word occupied or "unusable") and one of the already cleared frequencies is used as fallback frequency. The method can notably comprise storing 243 a date and time of the detection and updating 244 indication of availability of the occupied channel. The status of the occupied channel can be moved for instance to "occupied" (or "unusable"). The method then comprises choosing 245 an alternate frequency channel according to its stored indication of availability.

For instance, the alternate frequency channel can be chosen first in the band IIe (with a size of 80 MHz if it is possible, else 40 MHz for instance).

If no cleared frequency, marked as available, belongs to the band IIe, the alternate frequency can be chosen in the band II (with a size of 80 MHz if it is possible, else 40 MHz for instance).

If no cleared frequency, marked as available, belongs to the band IIe or to the Band II, the alternate frequency can be chosen in the band I (with a size of 80 MHz if it is possible, else 40 MHz for instance).

An indication identifying the new chosen frequency can be stored in the NVRAM.

In the illustrated embodiment, all the channels that will be marked as unavailable (or in other words occupied or unusable) in the current day due to radar detection, can be rechecked during a night clearing operation.

In the illustrated embodiment, transmitting and/or reception of data is performed only on at least one frequency channel for which stored information indicates that a scan, without any radar detection has already been performed and that no radar has been detected since the last scan in this channel.

According to FIG. 2, the method comprises a second configuring 250. This second configuring 250 can be performed several times, notably periodically, for instance on a daily basis (for instance every night). According to the particular embodiment of FIG. 2, the second configuring 250 comprises checking 253 at least one frequency channel being still un-cleared and/or being marked as unusable (or occupied). In some embodiments, all frequencies can be scanned (even the ones considered as "cleared" frequency), or all the frequencies either not yet scanned or where a radar has been previously detected since the last check, or only some of the frequency channels either not yet scanned or where a radar has been previously detected since the last check. Notably, the second configuring can comprise checking more channels than the number of operating channel(s) and backup channel(s) needed. The method can comprise, prior to the checking 253 a selecting 252 of the channels that are to be checked. The selecting 252 can be similar to the selecting 232 performed during the first configuring 230 and already detailed herein.

In the illustrated embodiment, the Access Point performs DFS scanning of all the DFS channels that have not been cleared since the boot of the device. The Access Point also performs DFS scanning of all the DFS channels that are marked as occupied (or unusable), because of a radar detection, for which no radar has been detected from the last 30 minutes. This constraint can be checked by comparing the detection time stored in association with a DFS channel with the actual time.

The time spent in checking a DFS channel can be assumed as 1 minute per 20 MHz for non-weather channel and 10 minutes per 20 MHz weather channel for instance. The second configuring also comprise storing, for each checked channel, an indication of availability in the NVRAM. In some embodiments, this second configuring can be performed when it is less likely to be noticed by a user, for instance, when the STB is not transmitting or receiving data.

For instance, the second configuring can be performed when none of the cleared frequency channels are used by the access point, or each night at a specific hour, or when there's a few data being transmitted and/or received, or when the transmitted and/or received data is not associated to a time constraint (like real time data). In other embodiments, the second configuring can be triggered by a specific event, like a manual action of a user and/or entering into a power safe and/or maintenance mode for instance. It can also follow another boot of the device As a result, in some embodiments, after the second configuring, the STB will have cleared all the usable DFS channels. Thus, after the second configuring, all the channels that were not yet cleared or that were marked as unusable (due to radar detection) for more than 30 minutes before the second configuring can become available again.

In the illustrated embodiment of FIG. 3, the second configuring comprises choosing 255 the operational channel to be used in the operation mode of the STB. Such an embodiment permits to choose as soon as being checked a more accurate frequency channel than the one formerly used in the operational mode.

In other embodiments, the choosing 255 can be delayed, for instance until the next boot of the STB. Such an embodiment can sometimes lead to a simpler of a processor, and thus to a cheaper device. In still other embodiment, the enabled frequency channel may stay the same, until it becomes occupied.

Is it to be noted that, even if not illustrated for clarity purpose, optional scan can be needed during the operating state, when the number of clear channels is not sufficient to permit the operating of the device. This can happen when radar is detected in several cleared channels, thus forbidding the use of those channels for a while. In such a case, the first configuring can be performed again.

In case of STB reboot 210, (thus not being the initial boot of the device), the device checks the localization information 240. If the STB has been moved to a different location (i.e. if an actual location information obtained by the Access Point differs from the stored location information), the NVRAM content can be erased and a first configuring 230 is performed.

In the illustrated embodiment, if the STB is still at its previous location, the Access Point takes into account the information stored in the NVRAM. Notably, the stored information can be used for identifying the last used 20 MHz channels (for instance 2 contiguous channels for a total size of 40 MHz, or 4 contiguous channels for a total size of 80 MHz).

For instance, the Access Point reads the NVRAM content for identifying the cleared channels (either operational or backup channels) and starts Wi-Fi operation 240 with according to the availability indication stored in the NVRAM.

As already explained, the second configuring 250 can be performed when it is less likely to disturb a user of the device, for instance when no transmission or reception or data occurs. Indeed, in embodiments where the device does not have the capability of performing a scan of a channel while operating in other channel, performing a scan can delay an operation of the device on another channel. For instance, In the illustrated embodiment of FIG. 2, the device is not in operation during the second configuring and can restart its operating when the second operating ends.

Figure 4:
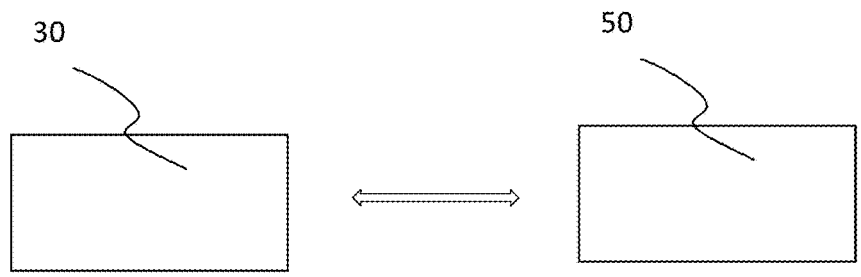
FIG. 4 illustrates a connection of a client device to the communication network device of FIG. 3.
Figure 5:
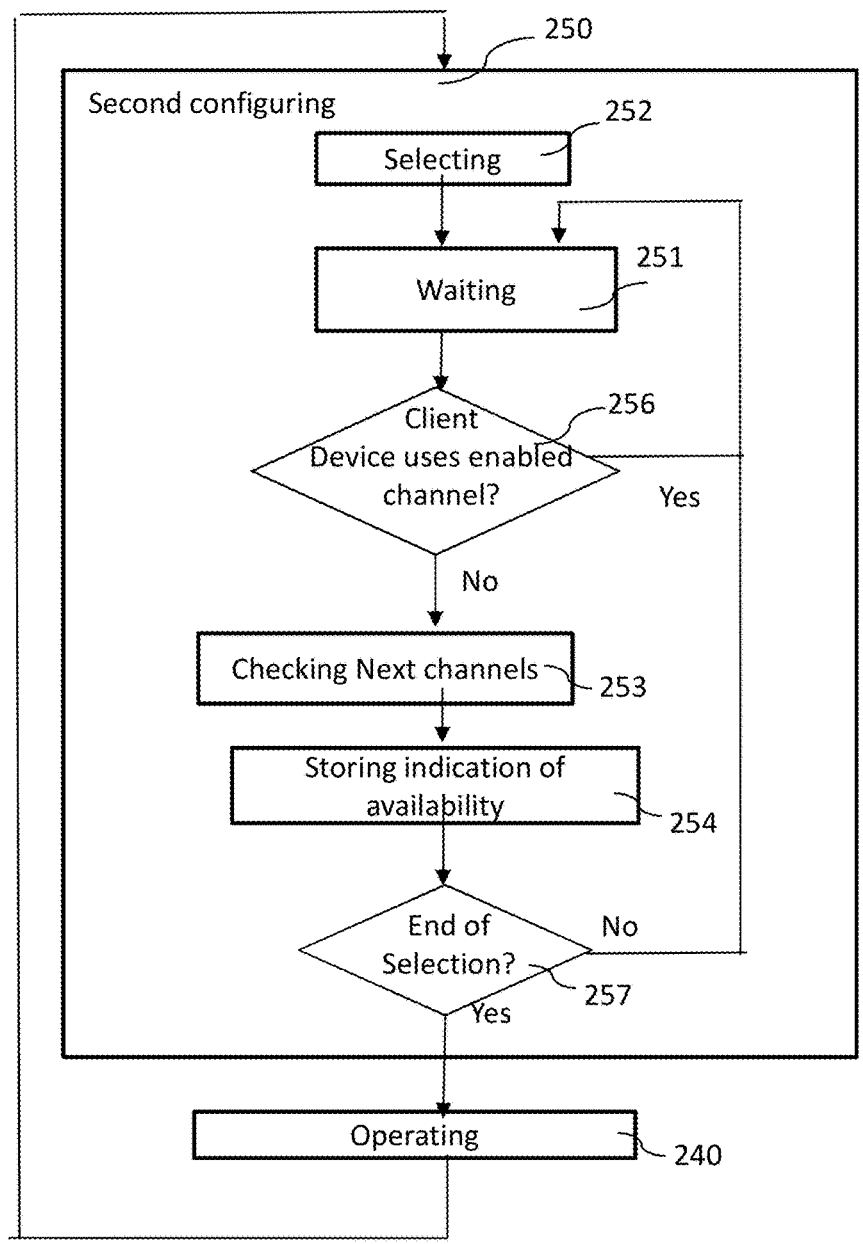
FIG. 5 is a functional diagram that illustrates a second configuring of the method of the present disclosure, according to a particular embodiment.

A variant is illustrated by FIGS. 4 and 5. In the embodiment illustrated by FIG. 4, the method is performed on the device 30 comprising a WLAN access point. The device 30 can communicate, using its WLAN Access point, on at least one enabled frequency channel with at least one another wireless client device 50 (for instance a smartphone, a wireless computer, a tablet, a wearable communication device, like a connected watch, a Set-Top-Box). For instance, the device 30 and the other device 50 can exchange data in order for the other device to be connected with the WLAN AP. Such data can include for instance, in case of a manual connection, at least one network access code (like a Wi-Fi security key) entered by a user of the other device 50 and transmitted to the device 30 or, in case of automatic connection, data exchanged between both devices using an automatic connection service of the device 30 (like a Wi-Fi Protected Set-Up (WPS) service). They can also exchange audio and/or video data. For instance, the device 30 can transmit a video stream to the other device 50. The video stream can be rendered on the other device 50.

According to the particular embodiment of FIG. 5, the second configuring 250 is performed conditionally, depending of the use of the operational channel by at least one of the client devices. The second configuring can comprise testing 251 if at least one client device is currently using the enabled channel of the Access point of the device 30. Depending on the embodiment, the testing 256 can be performed before or after the selecting 252 of the channels to be checked.

According to FIG. 5, the method comprises, prior to the testing 256, waiting 251 a given period of time. Such a waiting can ensure that a client device that wants to connect to the access point of the device 30 will have enough time to connect and/or to be detected as using the channel before the next iteration (testing, checking (or scan of at least one channel) and storing). In the illustrated embodiment, the method comprises waiting 251 for a given period of time of several ten seconds, for instance 30 seconds. Then, another test of a use of the access point is performed. In other embodiment, where the second configuring is performed periodically, the current second configuring can be canceled when the enabled access point is used by a client device.

When no client device is using the access point, (or in other words when no client device is connecting and/or communicating with the access point), the second configuring comprises, as already explained in link with FIG. 2, checking 253 at least one frequency channel and storing 254 an indication of availability of the checked channel. However, according to the illustrated embodiment, the checking 253 is performed only on a limited number of channels (for instance one, two, three or four channels) and not on all the selected channels, before the next test of a use of the operational frequency. The limited number of channels can be defined dynamically by a user interface or remotely by the supplier of the device.

In the illustrated embodiment, notably, it is performed on a limited number of consecutive channels. Such an embodiment can permit to help enhancing the user's experience of a user of the other device, as a command entered by a user will not be delay too much. Indeed, as already explained a scan of a frequency channel can take 10 minutes. Then, the method comprises testing 257 whether all the selected channels have been checked. If so, the second configuring ends. If not, the testing 251 of a client device connection, the checking 253 and storing 254 can be performed iteratively on few other channels selected as to be checked.

It is to be noted that, as illustrated in FIG. 2, the second configuring 250 can comprise in some embodiments choosing an operational channel. in other embodiments, as illustrated in FIG. 5, the operational channel can be kept unchanged.

The present disclosure has been described in relation to a WIFI communication network device and/or system.

Of course, as it will be understandable for a person skilled in the art, the present disclosure may also been applied in wireless distribution system using other network protocols, notably network protocols with acknowledgment of frames, like WIFI, WiMAX, or Bluetooth protocols.

The invention claimed is:

1. A method, to be performed in a communication network device comprising a wireless local area network (WLAN) access point adapted to use at least one operational frequency channel of a set of frequency channels to transmit or receive data when said WLAN access point is in an operational mode, said method comprising:
configuring said Wireless Area Network (WLAN) access point for using at least one operational frequency channel chosen from a set of frequency channels including at least one restricted frequency channel, a use of said restricted frequency channel being restricted by an availability of said restricted frequency channel, said configuring being performed according to a checked availability of at least one of said restricted frequency channel;
storing information related to a location of said WLAN access point at the time of a first checking of an availability of a first proper sub-set of said set of frequency channels, said first proper sub-set including at least one first of said restricted frequency channel;
performing at least one second checking of an availability of at least one second restricted frequency channel of said set of frequency channels, said second restricted frequency channel being not included in said first proper sub-set,
said first checking being performed when a location information deduced from an obtained location of the WLAN access point is different from said stored location related information.

2. The method of claim 1, wherein said first checking is performed during a first boot of the WLAN access point in a location.

3. The method of claim 1, wherein at least one of said at least one second checking is performed for all not already checked restricted frequency channels of said set of frequency channels.

4. The method of claim 1, wherein restricted frequency channels checked as unusable have to be left for a duration and wherein at least one of said at least one second checking is performed for all restricted frequency channels of said set of frequency channels which use is not forbidden at the time of said at least one second checking.

5. The method of claim 1, wherein the method further comprises varying a number of chosen operational frequency channels according to said checked availability.

6. A communication network device comprising a wireless local area network (WLAN) access point adapted to use at least one operational frequency channel of a set of frequency channels to transmit or receive data when said WLAN access point is in an operational mode, said communication network device comprising at least one processor adapted for:
configuring said Wireless Area Network (WLAN) access point for using at least one operational frequency channel chosen from a set of frequency channels including at least one restricted frequency channel, a use of said restricted frequency channel being restricted by an availability of said restricted frequency channel, said configuring being performed according to a checked availability of at least one of said restricted frequency channel;

storing information related to a location of said WLAN access point at the time of a first checking of an availability of a first proper sub-set of said set of frequency channels, said first proper sub-set including at least one first of said restricted frequency channel;

performing at least one second checking of an availability of at least one second restricted frequency channel of said set of frequency channels, said second restricted frequency channel being not included in said first proper sub-set, said first checking being performed when a location information deduced from an obtained location of the WLAN access point is different from said stored location related information.

7. The communication network device of claim 6 wherein said communication network device comprises a memory zone adapted to store configuration data comprising an indication of said checked availability of said first or second restricted frequency channel.

8. The communication network device of claim 7 wherein said configuration data is stored in a memory zone located in a device distinct from said communication network device.

9. The communication network device of claim 6, wherein said at least one second checking is performed when said at least one chosen operational frequency channel is not used by a client device of said WLAN access point.

10. The communication network device of claim 6 wherein said first checking and said configuring is are performed during a first boot of the WLAN access point in a location.

11. The communication network device of claim 6 wherein at least one of said at least one second checking is performed for all not already checked restricted frequency channels of said set of frequency channels.

12. The communication network device of claim 6, wherein restricted frequency channels checked as unusable have to be left for a duration and wherein at least one of said second checking is performed for all restricted frequency channels of said set of frequency channels which use is not forbidden at the time of said at least one second checking.

13. A communication network system comprising a server and at least one communication network device, said at least one communication network device comprising a wireless local area network (WLAN) access point adapted to use at least one operational frequency channel of a set of frequency channels to transmit or receive data when said WLAN access point is in an operational mode, said at least one communication network device comprising at least one processor adapted for:

configuring said Wireless Area Network (WLAN) access point for using at least one operational frequency channel chosen from a set of frequency channels including at least one restricted frequency channel, a use of said restricted frequency channel being restricted by an availability of said restricted frequency channel, said configuring being performed according to a checked availability of at least one of said restricted frequency channel;

storing information related to a localization of said WLAN access point at the time of a first checking of an availability of a first proper sub-set of said set of frequency channels, said first proper sub-set including at least one first of said restricted frequency channel;

performing at least one second checking of at least one restricted frequency channel of said set of frequency channels, said second restricted frequency channel being not included in said first proper sub-set, said first checking being performed when a location information deduced from an obtained location of the WLAN access point is different from said stored location related information.

14. The communication network system of claim 13 wherein said communication network system comprises at least two communication network devices and wherein said at least one operational frequency is chosen according to configuration data comprising indications of availability stored by several communication network devices.

15. A non-transitory computer readable program product, comprising program code instructions for performing, when said non-transitory software program is executed by a computer, a method according to claim 1.

16. Non-transitory computer readable storage medium carrying a software non-transitory program comprising program code instructions for performing, when said non-transitory software program is executed by a computer, a method according to claim 1.

* * * * *